(12) United States Patent
Turcotte et al.

(10) Patent No.: US 11,609,394 B2
(45) Date of Patent: Mar. 21, 2023

(54) LATCHING FOR A TRANSCEIVER MODULE

(71) Applicant: Lumentum Operations LLC, San Jose, CA (US)

(72) Inventors: Georges Turcotte, Ottawa (CA); Adonios Bitzanis, Ottawa (CA)

(73) Assignee: Lumentum Operations LLC, San Jose, CA (US)

(*) Notice: Subject to any disclaimer, the term of this patent is extended or adjusted under 35 U.S.C. 154(b) by 63 days.

(21) Appl. No.: 17/249,959

(22) Filed: Mar. 19, 2021

(65) Prior Publication Data

US 2021/0208348 A1 Jul. 8, 2021

Related U.S. Application Data

(62) Division of application No. 16/453,547, filed on Jun. 26, 2019, now Pat. No. 10,955,628.

(60) Provisional application No. 62/712,777, filed on Jul. 31, 2018.

(51) Int. Cl.
G02B 6/42 (2006.01)

(52) U.S. Cl.
CPC ......... *G02B 6/4246* (2013.01); *G02B 6/4292* (2013.01)

(58) Field of Classification Search
CPC .. G02B 6/4246; G02B 6/4292; G02B 6/4277; G02B 6/4261
See application file for complete search history.

(56) References Cited

U.S. PATENT DOCUMENTS

| | | | |
|---|---|---|---|
| 6,851,867 B2* | 2/2005 | Pang | G02B 6/4261 385/59 |
| 9,411,111 B2* | 8/2016 | Banal, Jr. | G02B 6/4292 |
| 9,929,500 B1* | 3/2018 | Ista | H01R 13/6271 |
| 10,079,452 B1 | 9/2018 | Zhang et al. | |
| 10,955,628 B2 | 3/2021 | Turcotte et al. | |
| 2003/0161108 A1 | 8/2003 | Bright et al. | |
| 2005/0195565 A1 | 9/2005 | Bright et al. | |
| 2009/0279831 A1* | 11/2009 | Luo | H01R 13/6335 385/53 |
| 2011/0081114 A1 | 4/2011 | Togami et al. | |
| 2012/0275120 A1* | 11/2012 | Nguyen | G02B 6/4284 361/747 |
| 2016/0266340 A1 | 9/2016 | Zhang et al. | |
| 2017/0090128 A1* | 3/2017 | Mori | G02B 6/3893 |
| 2017/0343740 A1 | 11/2017 | Nguyen | |
| 2017/0363827 A1* | 12/2017 | Yang | G02B 6/3825 |
| 2020/0041737 A1 | 2/2020 | Turcotte et al. | |

* cited by examiner

*Primary Examiner* — Ellen E Kim
(74) *Attorney, Agent, or Firm* — Harrity & Harrity, LLP

(57) ABSTRACT

An optical transceiver may include a housing including a surface cutout. The surface cutout may be for receiving a locking tang from a cage and for being disengaged by a slide from an unlocking tool wherein the surface cutout is disposed on the housing at a position such that the surface cutout is entirely within the cage with respect to an electromagnetic interference (EMI) gasket of the cage when the optical transceiver is inserted into the cage.

20 Claims, 7 Drawing Sheets

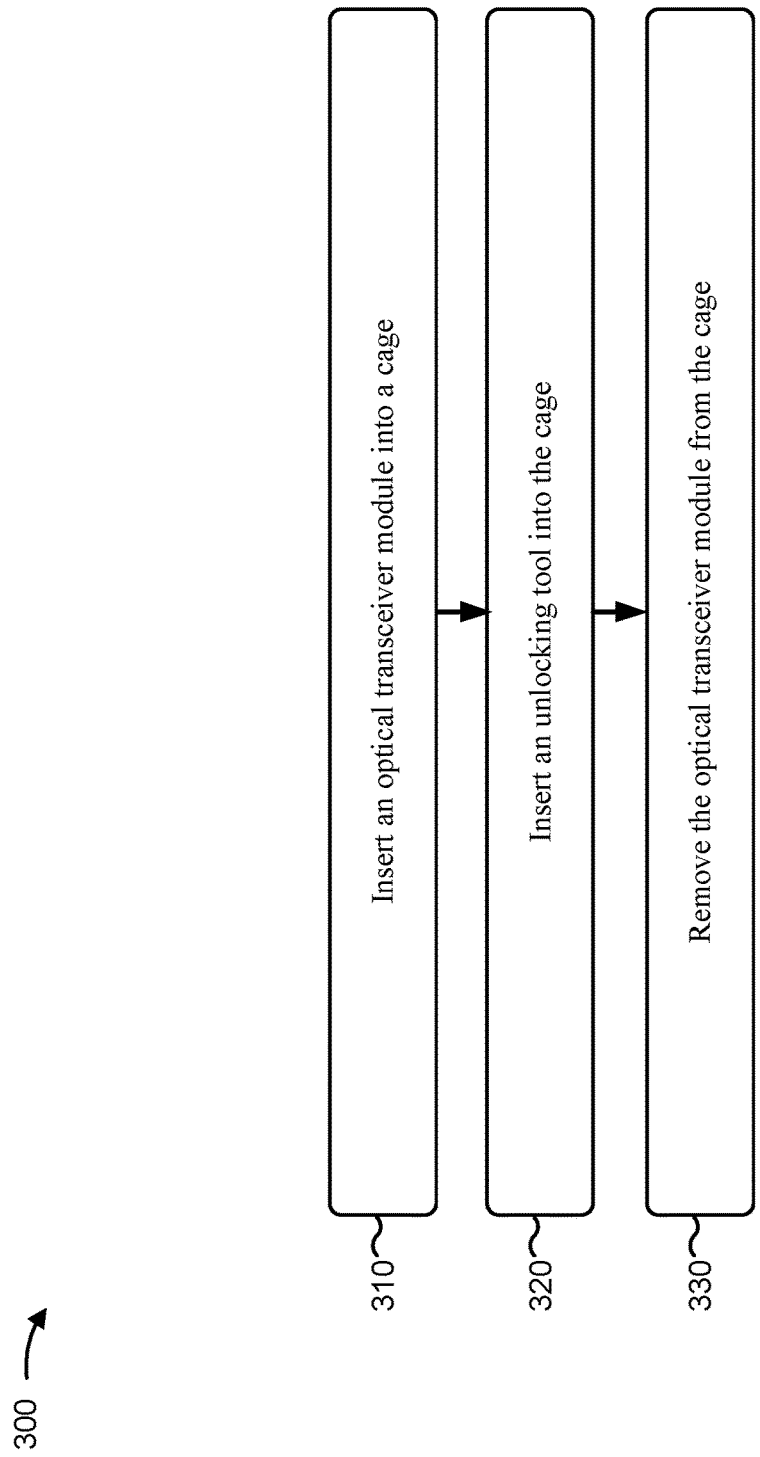

LATCHING FOR A TRANSCEIVER MODULE

RELATED APPLICATIONS

This application is a divisional of U.S. application Ser. No. 16/453,547, filed Jun. 26, 2019 (now U.S. Pat. No. 10,955,628), which claims priority under 35 U.S.C. § 119 to U.S. Provisional Patent Application No. 62/712,777, filed on Jul. 31, 2018, the contents of which are incorporated by reference herein in their entirety.

TECHNICAL FIELD

The present disclosure relates to optical modules. More particularly, some aspects of the present disclosure relate to latching for an optical transceiver with reduced electromagnetic interference (EMI) emissions when plugged into a cage.

BACKGROUND

An optical module, such as an optical transceiver, may be inserted into a cage as part of an optical communications system. A cage or a set of cages within a relatively small space forming, for example, a rack may include many optical modules, such as optical transmitters, optical receivers, and/or optical transceivers for the optical communications system. As optical data rates increase, a quantity of optical modules that are plugged into the cage or set of cages may increase and/or an amount of electromagnetic interference (EMI) emitted by each optical module may increase. EMI emissions from a first optical module may cause problems for operation of a second optical module within a threshold proximity of the first optical module. Alternatively, EMI emissions from a particular optical module in a particular cage may cause problems for operation of other components of the optical communications system within a threshold proximity of the particular optical module.

SUMMARY

An optical transceiver may include a housing including a surface cutout. The surface cutout may be for receiving a locking tang from a cage and for being disengaged by a slide from an unlocking tool wherein the surface cutout is disposed on the housing at a position such that the surface cutout is entirely within the cage with respect to an electromagnetic interference (EMI) gasket of the cage when the optical transceiver is inserted into the cage.

An optical module may include a housing including a surface cutout, the surface cutout for engaging a tang of a cage and for being disengaged by a slide of an unlocking tool, wherein the optical module is insertable into the cage such that the surface cutout engages with the tang and such that the surface cutout is disposed entirely within the cage with respect to an EMI gasket of the cage, wherein the optical module is insertable into the cage without the unlocking tool, and wherein the optical module is shaped such that the unlocking tool is insertable between the housing and the EMI gasket of the cage to disengage the tang from the surface cutout.

An unlocking tool for an optical module may include a slide that is at least partially independent of the optical module, the slide being insertable into a cage between an EMI gasket of the cage and a surface of the optical module to disengage a locking tang of the cage from a corresponding cutout of the optical module.

BRIEF DESCRIPTION OF THE DRAWINGS

FIG. 3 is a flow chart of an example process for locking and unlocking an optical module.

DETAILED DESCRIPTION

The following detailed description of example implementations refers to the accompanying drawings. The same reference numbers in different drawings may identify the same or similar elements.

Figure 1:
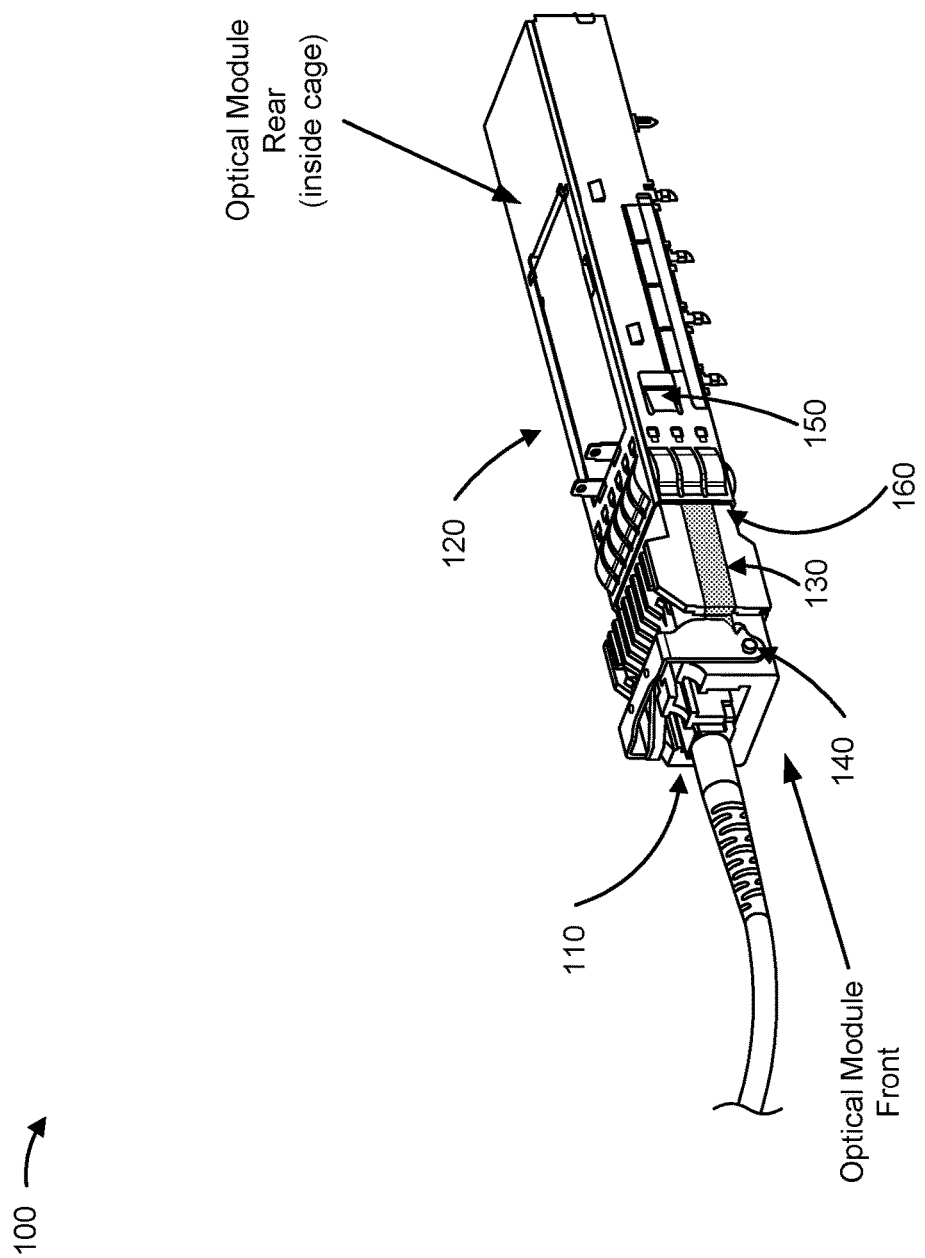
FIG. 1 is a diagram of an existing optical module with an integrated unlocking tool in a cage.

In an example 100 illustrated in FIG. 1, a cage 120 may include an EMI gasket to prevent EMI emissions from an optical module 110. The EMI gasket may be located at position 160 in the cage 120 near an opening for receiving the optical module 110. The optical module 110 may be inserted into the cage 120 such that a portion of the optical module 110 (e.g., a rear of the optical module) extends past the EMI gasket into the cage 120. The optical module 110 may include an integrated locking and unlocking mechanism 130 (e.g., a slide) and 140 (e.g., a lever mechanism) to enable the optical module 110 to be locked in position within the cage 120. The integrated locking and unlocking mechanism 130 and 140 may include a lever mechanism 140 connected to a set of slides 130. The lever mechanism 140 may be located at a front end of the optical module 110 and may connect to the set of slides 130. The set of slides 130 may reside in recesses in the optical module 110. The set of slides 130 and corresponding recesses originate near the front end of the optical module 110 and may extend toward the back end of the optical module 110. The ends of the recesses may receive a locking tang of the cage, at location 150, to lock the optical module 110 once inserted into the cage 120.

The lever mechanism 140 (e.g. a bail latch) may operate the set of slides 130 to, for example, unlock the optical module 110 from the cage 120. When the optical module 110 is inserted into a cage 120, the set of slides 130, and recesses associated therewith, may extend from a location outside of the EMI gasket (e.g., towards the front of the optical module 110) of the cage 120 to a location inside of the EMI gasket (e.g., toward the rear of the optical module 110). Manipulation of the lever mechanism 140 outside the cage 120 moves the set of slides 130 within the recesses inside the cage 120. The movement of the set of slides 130 may disengage the locking tang or locking tangs from the recesses inside the cage 120 and beyond the EMI gasket. Disengaging the locking tang may allow removal of the optical module 110 from the cage 120.

However, a disadvantage of this example is that a gap exists between a recess and a corresponding slide 130 on each side of the optical module 110. This gap may allow EMI leakage that may not be prevented by the EMI gasket. For example, EMI emissions may pass through the gap and may cause interference for other components. An additional disadvantage is that the recesses may take up valuable space to accommodate the set of slides 130, thereby limiting available space for other optical components within the optical module.

In contrast, according to some implementations described herein, an optical module may be configured with a surface cutout instead of a recesses, where the surface cutout is disposed entirely within an EMI gasket of a cage (e.g., beyond the EMI gasket toward the rear of the optical module) when the optical module is inserted into the cage. The optical module may be paired with an at least partially independent unlocking tool that may be removed from the optical module and/or from the cage when the optical module is to operate. In this way, the EMI gasket is enabled to form an improved EMI seal around a surface of the optical module, thereby reducing EMI emission leakage. In this way, performance of an optical communications system is improved relative to a permanently attached integrated locking and unlocking mechanism. Furthermore, by providing an independent unlocking tool, the unlocking tool and/or the surface cutout may be configured to form a lock and key arrangement, thereby improving security by reducing a likelihood of theft of optical modules that are plugged into cages. Moreover, by reducing a size of the surface cutout and locating the surface cutout entirely within the EMI gasket, an amount of available space for other optical components within the optical module may be increased. For example, an implementation may save between approximately 100 cubic millimeters ($mm^3$) and 200 $mm^3$ of space in the optical module.

Figure 2A:
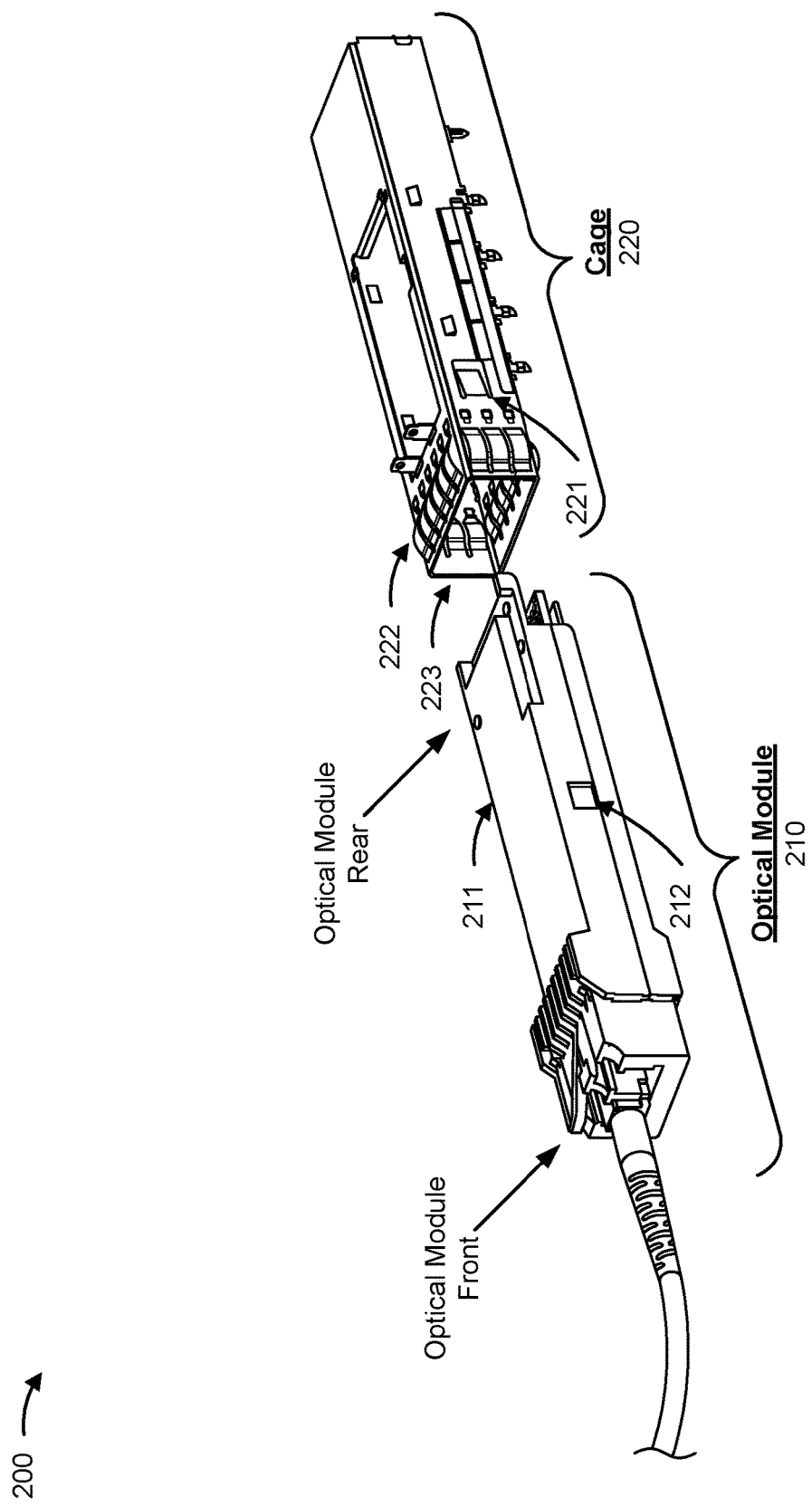
FIGS. 2A-2E are diagrams of an example implementation described herein.

FIGS. 2A-2E are diagrams of an example implementation 200 described herein. As shown in FIG. 2A, example implementation 200 may include an optical module 210 and a cage 220.

In some implementations, optical module 210 may be an optical transceiver (e.g., an optoelectronic transceiver) of an optical communications system (e.g. a telecommunications system or a data communications system). For example, optical module 210 may be a part of an endpoint (e.g., a node) of the optical communications system for transmission and/or reception of information via the optical communications system and an electrical communications system. In some implementations, optical module 210 may include a housing 211. For example, optical module 210 may include a housing 211 that encases one or more optical components of optical module 210, such as one or more optical transmitters, optical receivers, laser diodes, photodetectors, drivers, planar lightwave chips, silicon photonics modules, and/or the like. In some implementations, housing 211 may include a surface cutout 212. For example, housing 211 may include an indentation, a groove, a gap, and/or the like that is to engage with a locking tang 221 of cage 220 if the optical module 210 is inserted into the cage 220. In some implementations, surface cutout 212 may be disposed on housing 211 at a position such that, when optical module 210 is inserted into cage 220, surface cutout 212 is entirely within cage 220 with respect to an EMI gasket 222. For example, the position of the surface cutout 212 may be between a rear end of the optical module 210 and a region of the optical module 210 that aligns with an EMI gasket 222 of a cage 220 when the optical module 210 is inserted into the cage 220.

In some implementations, optical module 210 may include multiple surface cutouts. For example, optical module 210 may include a first surface cutout 212 on a first side of optical module 210 to receive a first locking tang 221, and may include a second surface cutout 212 on a second side of optical module 210 to receive a second locking tang 221. In some implementations, a surface cutout 212 may be associated with a particular depth. For example, a depth of surface cutout 212 may be less than approximately 5 millimeters (mm), less than approximately 2 mm, between approximately 0.5 mm and 2 mm, and/or the like. In some implementations, the depth of surface cutout 212 may be a threshold depth to secure locking tang 221. Additionally, or alternatively, surface cutout 212 may be associated with a length of between approximately 8 mm and 26 mm, a height of between approximately 1 mm and 9 mm, and/or the like. Surface cutout 212 enables a greater usable internal volume of optical module 210 compared to, for example, recesses associated with slides 130 shown in FIG. 1 based on a volume of surface cutout 212 being less than that of the recesses.

In some implementations, cage 220 may be a component that receives optical module 210. For example, cage 220 may be a portion of a rack component (e.g., that includes a plurality of cages 220). In some implementations, a portion of cage 220 may form locking tang 221. For example, cage 220 may include a flange that is angled to engage with surface cutout 212 of housing 211. In this case, surface cutout 212 may not be disengageable from locking tang 221 without use of an unlocking tool, as described herein.

In some implementations, cage 220 may include EMI gasket 222 at an opening 223 of cage 220. For example, cage 220 may include an EMI gasket 222 that is to form a continuous EMI seal around housing 211 (e.g., with a surface of housing 211) to prevent EMI leakage from within cage 220. In this case, EMI gasket 222 may be disposed between opening 223 and locking tang 221 to prevent EMI emissions associated with surface cutout 212 when surface cutout 212 is engaged with locking tang 221 (e.g., when optical module 210 is inserted into cage 220). In some implementations, EMI gasket 222 may include a set of flanges. For example, EMI gasket 222 may include a set of flanges that are sized to enable optical module 210 to be inserted into cage 220, but to form an EMI seal by pressing against a surface of housing 211 when optical module 210 is inserted into cage 220.

Figure 2B:
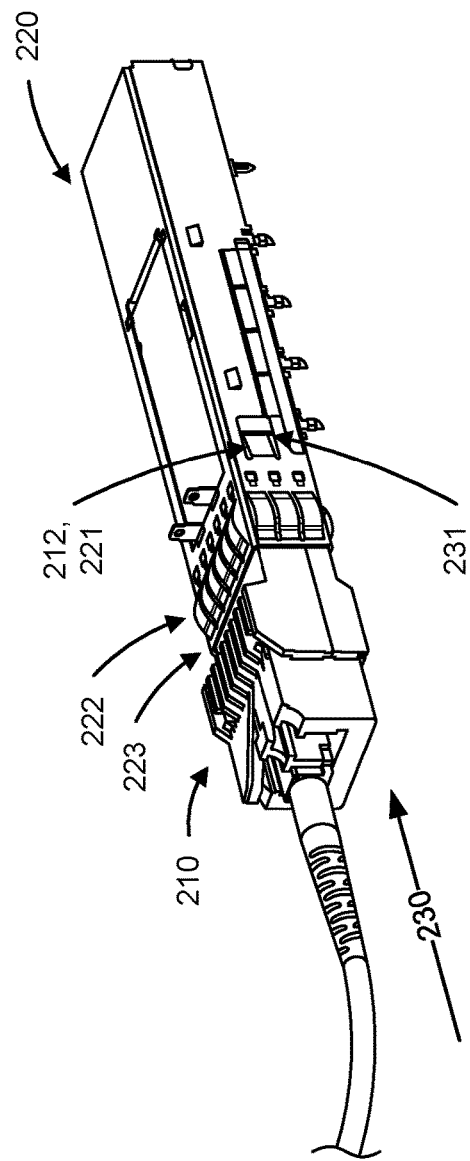

As shown in FIG. 2B, and by reference number 230, optical module 210 may be inserted into cage 220. For example, optical module 210 may be inserted into opening 223 of cage 220 to cause locking tang 221 to engage with surface cutout 212, as shown by reference number 231. In this case, surface cutout 212 may receive locking tang 221 and may thereby retain optical module 210 within cage 220. In this way, optical module 210 may be locked into position in cage 220. As shown by reference number 231, EMI gasket 222 is disposed between opening 223 of cage 220 and surface cutout 212 of optical module 210. In this way, EMI gasket 222 may prevent leakage of EMI emissions. Optical module 210 enables an improved EMI seal when an unlocking tool, as described in more detail below, is not present because a gap between the unlocking tool and the optical module (e.g., the recesses corresponding to slides 130) has been removed, thereby reducing EMI leakage.

Figure 2C:
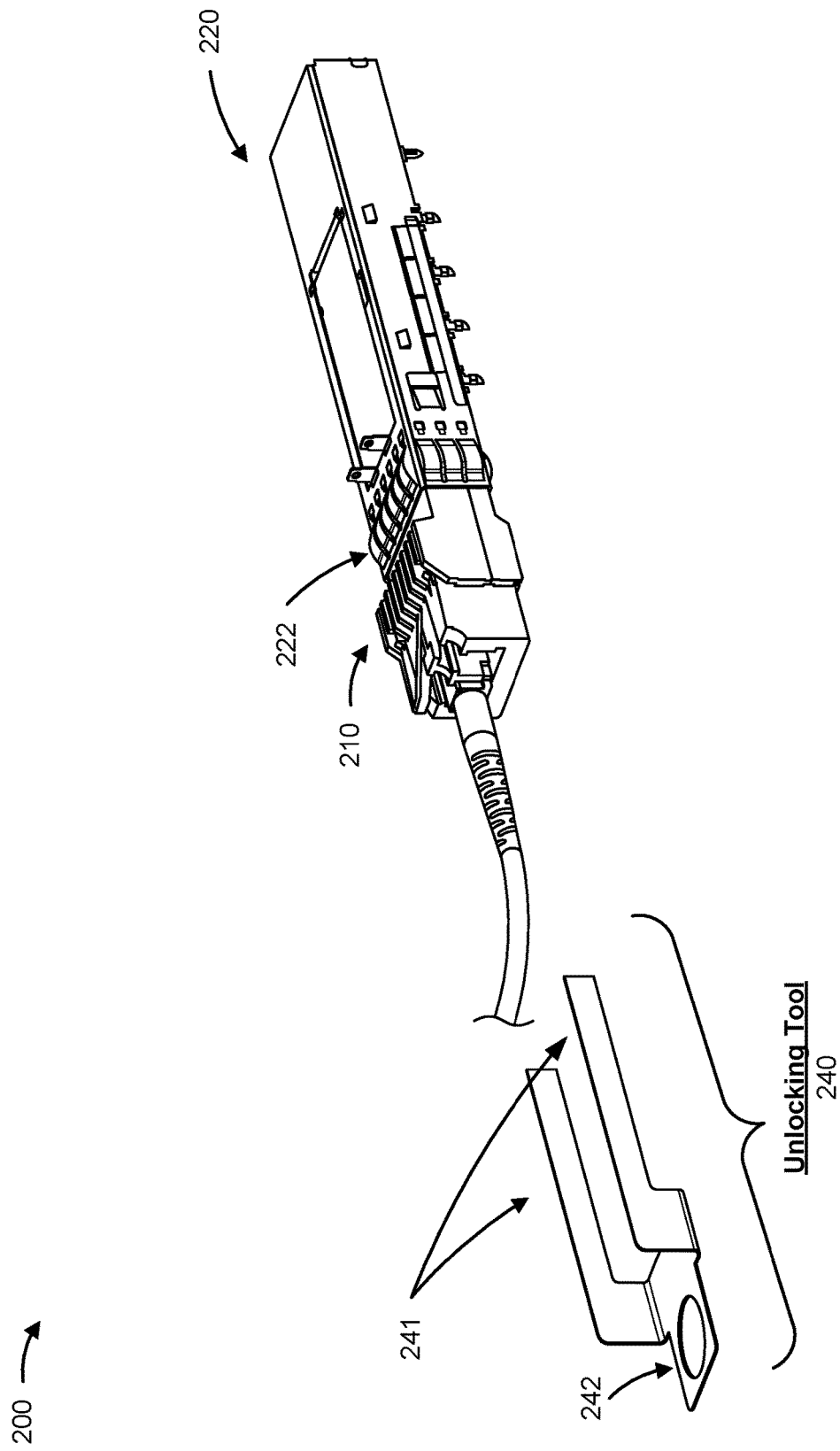

As shown in FIG. 2C, an unlocking tool 240 may be aligned to optical module 210 and cage 220. Unlocking tool 240 may include one or more slides 241 (which may also be referred to as arms). The slides 241 may be aligned to sides of optical module 210 to enable unlocking tool 240 to be inserted into cage 220 such that a slide 241 is disposed between surface cutout 212 and locking tang 221. In some implementations, unlocking tool 240 may include a pull 242 that may enable a user to insert unlocking tool 240 into and/or remove unlocking tool 240 from EMI gasket 222. In some implementations, slides 241 are associated with less than a threshold thickness. For example, slides 241 may be associated with a thickness of less than 0.2 mm to enable slides 241 to be inserted between a surface of housing 211 and EMI gasket 222.

In some implementations, unlocking tool 240 may be independent from optical module 210. For example, unlocking tool 240 may be a separate body that is not attached to optical module 210. Additionally, or alternatively, unlocking tool 240 may be partially independent from optical module 210. For example, unlocking tool 240 may be separate from optical module 210 when optical module 210 is operating within cage 220 (e.g., unlocking tool 240 is not fixed in a gap between EMI gasket 222 and housing 211), but may remain attached to optical module 210 by, for example, a dongle, a cord, and/or the like. In this case, unlocking tool 240 may, for example, hang from a cable of optical module 210 when optical module 210 is in use.

In some implementations, unlocking tool 240 may be keyed to surface cutout 212 and/or locking tang 221. For example, unlocking tool 240 and surface cutout 212 and/or locking tang 221 may include a set of matched grooves, indentations, and/or another type of keying mechanism to match unlocking tool 240 to surface cutout 212 and/or locking tang 221. In some implementations, unlocking tool 240 may be a change key. For example, unlocking tool 240 may be specific to optical module 210 and/or cage 220, and may not be usable to remove other optical modules 210 from other cages 220. In some implementations, unlocking tool 240 may be a master key. For example, unlocking tool 240 may be general to a set of optical modules 210 and/or cages 220 and may be usable to remove each optical module 210 from each cage 220 of a particular set of optical modules 210 and cages 220. In this way, unlocking tool 240, optical module 210, and cage 220 may provide a security feature, thereby reducing a likelihood of theft of optical modules 210 from cages 220 by unauthorized actors.

In some implementations, unlocking tool 240 may be metal, plastic, another material, or a combination thereof. In some implementations, the slides 241 of unlocking tool 240 are smooth, thin, and/or rigid to improve insertion between optical module 210 and cage 220 or between optical module 210 and EMI gasket 222.

Figure 2D:
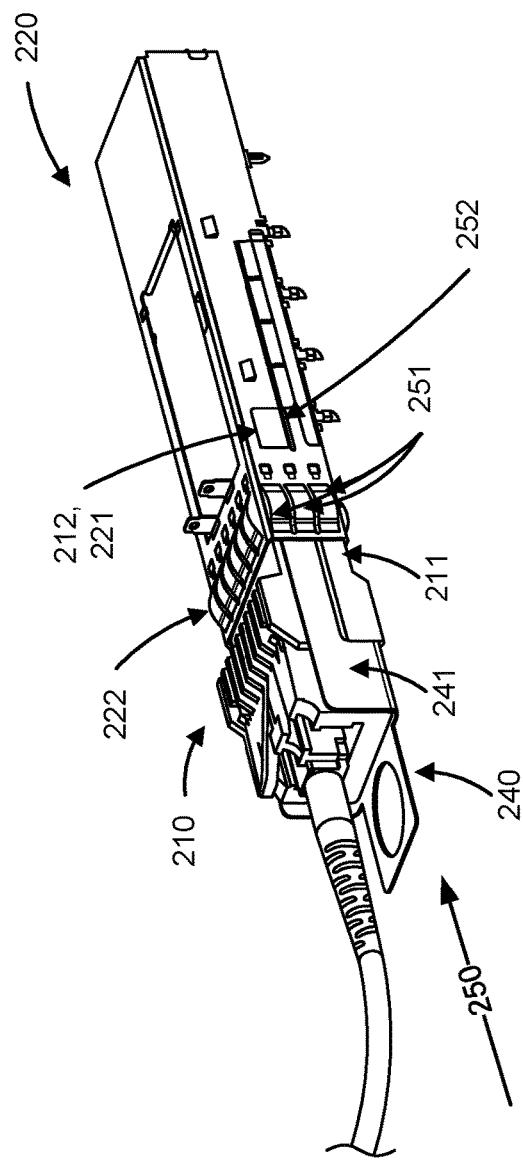

As shown in FIG. 2D, and by reference number 250, unlocking tool 240 may be inserted into cage 220 around optical module 210, with slides 241 being inserted between a surface of housing 211 and a surface of EMI gasket 222. In this case, EMI gasket 222 may be movable (e.g., flexible) to allow slides 241 to be inserted. For example, EMI gasket 222 may include a set of flanges 251, as shown, that may be displaced when slides 241 are inserted into cage 220. As shown by reference number 252, based on slides 241 being inserted into cage 220, locking tang 221 is displaced such that locking tang 221 is disengaged from surface cutout 212. In this way, optical module 210 is unlocked from cage 220.

Figure 2E:
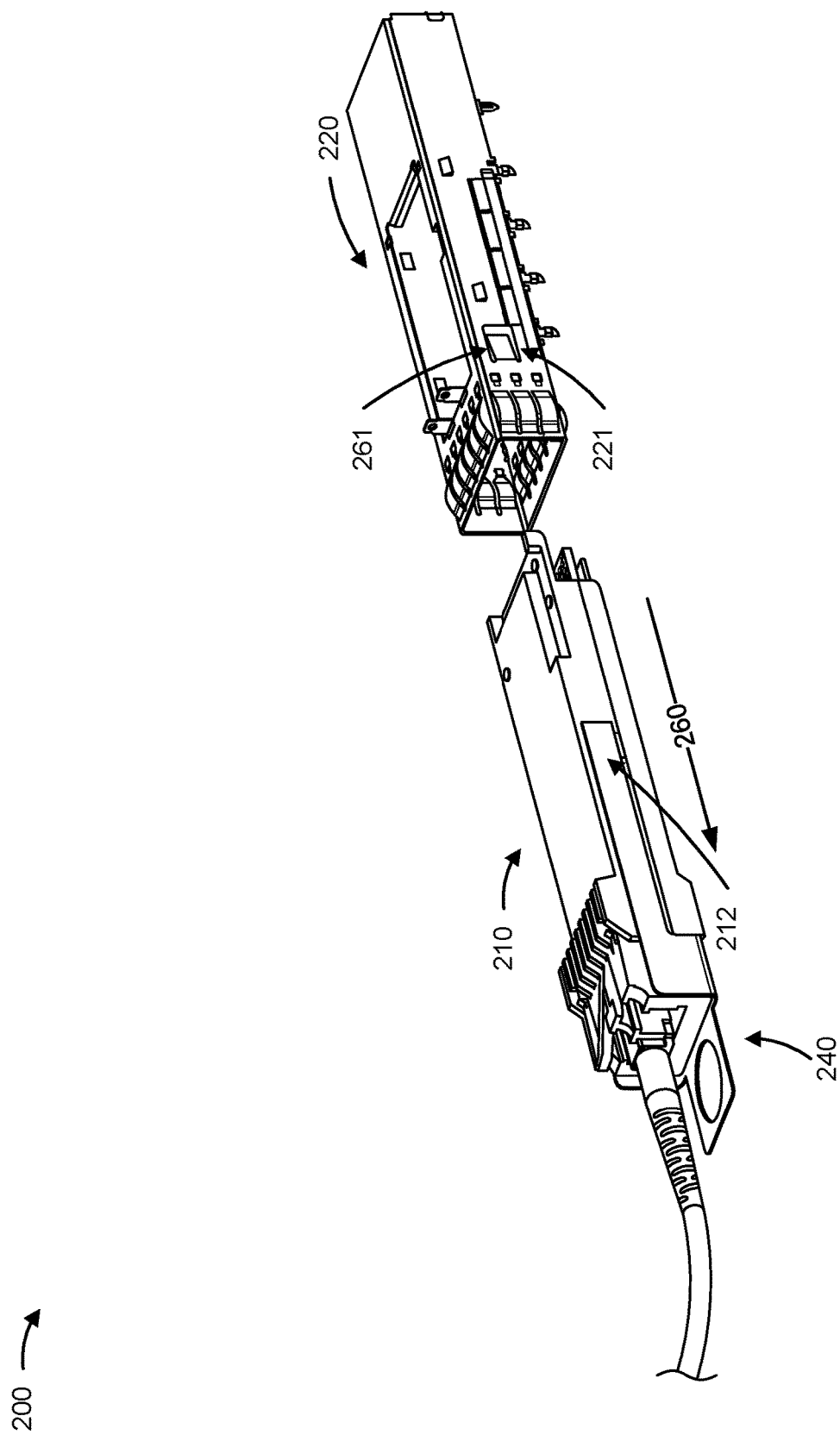

As shown in FIG. 2E, and by reference number 260, unlocking tool 240 and optical module 210 may be removed from cage 220. For example, based on unlocking tool 240 decoupling locking tang 221 from surface cutout 212, optical module 210 may be removed from cage 220. In some implementations, optical module 210 may include a removal handle. For example, optical module 210 may include a handle that extends from a rear of optical module 210 to ease a difficulty in pulling optical module 210 from cage 220 (or pushing optical module 210 into cage 220). In some implementations, optical module 210 may include a guard to protect an optical port (e.g., a local connector or little connector (LC) port). In this case, the removal handle may extend to partially cover and protect the optical port, thereby forming a guard. As shown by reference number 261, based on removing optical module 210 and unlocking tool 240 from cage 220, locking tang 221 returns to an initial position from a displaced position.

As indicated above, FIGS. 2A-2E are provided merely as one or more examples. Other examples may differ from what is described with regard to FIGS. 2A-2E.

FIG. 3 is a flow chart of an example process 300 for coupling and decoupling an optical transceiver and a cage. In some implementations, one or more process blocks of FIG. 3 may be performed using an unlocking tool.

As shown in FIG. 3, process 300 may include inserting an optical transceiver module into a cage (block 310). For example, to couple one or more devices associated with the cage to the optical transceiver module, an operator or device may insert the optical transceiver module into the cage. In some implementations, the optical transceiver module may be inserted into the cage without using the unlocking tool. For example, the optical transceiver module may be configured to displace a locking tang of the cage during insertion until the locking tang aligns with a surface cutout of the optical transceiver module. In this case, when the locking tang aligns with the surface cutout, the locking tang may return to an original position or within a threshold amount of the original position, thereby coupling with the surface cutout and locking the optical transceiver module in the cage. In some implementations, an unlocking tool may be used to insert the optical transceiver module into the cage. For example, the unlocking tool may be inserted into the cage to displace the locking tang, the optical transceiver module may be inserted into the cage, and the unlocking tool may be removed from the cage to enable the locking tang to engage with a surface cutout of the optical transceiver module. In some implementations, after being inserted into the cage, the optical transceiver module may operate for a period of time in an optical communications network.

As further shown in FIG. 3, process 300 may include inserting an unlocking tool into the cage (block 320). For example, an operator or device may insert the unlocking tool into the cage to unlock the optical transceiver module from the cage and to enable removal of the optical transceiver module from the cage. In this case, the unlocking tool may displace a position of the locking tang such that the locking tang is no longer coupled to the surface cutout of the optical transceiver module. In this way, the optical transceiver module may be unlocked from the cage.

As further shown in FIG. 3, process 300 may include removing the optical transceiver module from the cage (block 330). For example, an operator or device may remove the optical transceiver module from the cage based on using the unlocking tool to unlock the optical transceiver module from the cage. In some implementations, the unlocking tool may be removed with the optical transceiver module. For example, the unlocking tool may be disposed against a surface of the optical transceiver module during removal of the optical transceiver module. Additionally, or alternatively, the unlocking tool may remain disposed within the cage when the optical transceiver module is removed. In this case, the unlocking tool may be removed after removal of the optical transceiver module, or may remain in position in the cage until another optical transceiver module is to be inserted into the cage.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An unlocking tool for an optical module, comprising:
   a slide that is at least partially independent of the optical module,
      the slide being shaped for insertion into a cage between an electromagnetic interference (EMI) gasket of the cage and a surface of the optical module, and being shaped to disengage a locking tang of the cage from a corresponding cutout of the optical module,
      the slide being shaped to separate the optical module from the cage, such that the optical module is disposable within the cage without the unlocking tool being disposed within the cage, and
      the slide having a monolithic construction comprising:
         two flat arms arranged parallel to one another; and
         a pull portion disposed between and connecting the two flat arms,
            wherein each flat arm, of the two flat arms, has a first end connected to the pull portion and a second end distal to the pull portion,
            wherein each flat arm remains flat from the first end to the second end, and
            wherein each flat arm is arranged perpendicular to the pull portion relative to an axis aligned with the first end and the second end of the flat arm.

2. The unlocking tool of claim 1, wherein the unlocking tool is a change key specific to the optical module.

3. The unlocking tool of claim 1, wherein the unlocking tool is a master key general to a plurality of optical modules.

4. The unlocking tool of claim 1, wherein the slide is partially independent and is attachable to the optical module such that the unlocking tool is not fixed in a gap between a surface of the EMI gasket and the surface of the optical module.

5. The unlocking tool of claim 1, wherein the slide is independent such that the slide is not attached to the optical module.

6. The unlocking tool of claim 1, wherein a thickness of the slide is less than 0.2 millimeters (mm).

7. The unlocking tool of claim 1, wherein the two flat arms, when disposed between a housing of the optical module and the EMI gasket, are shaped to disengage the corresponding cutout from the locking tang, enabling removal of the optical module from the cage.

8. An unlocking tool for an optical transceiver, comprising:
   a slide that is at least partially independent of the optical transceiver,
      the slide being shaped for insertion into a cage between an electromagnetic interference (EMI) gasket of the cage and a surface of the optical transceiver, and being shaped to disengage a locking tang of the cage from a corresponding cutout of the optical transceiver,
      the slide being shaped to separate from the optical transceiver from the cage, such that the optical transceiver is disposable within the cage without the unlocking tool being disposed within the cage, and
      the slide having a monolithic construction comprising:
         two flat arms arranged parallel to one another; and
         a pull portion disposed between and connecting the two flat arms,
            wherein each flat arm, of the two flat arms, has a first end connected to the pull portion and a second end distal to the pull portion,
            wherein each flat arm remains flat from the first end to the second end, and
            wherein each flat arm is arranged perpendicular to the pull portion relative to an axis aligned with the first end and the second end of the flat arm.

9. The unlocking tool of claim 8, wherein the unlocking tool is a change key specific to the optical transceiver.

10. The unlocking tool of claim 8, wherein the unlocking tool is a master key general to a plurality of optical transceivers.

11. The unlocking tool of claim 8, wherein the slide is partially independent and is attachable to the optical transceiver such that the unlocking tool is not fixed in a gap between a surface of the EMI gasket and the surface of the optical transceiver.

12. The unlocking tool of claim 8, wherein the slide is independent such that the slide is not attached to the optical transceiver.

13. The unlocking tool of claim 8, wherein a thickness of the slide is less than 0.2 millimeters (mm).

14. The unlocking tool of claim 8, wherein the two flat arms, when disposed between a housing of the optical transceiver and the EMI gasket, are shaped to disengage the corresponding cutout from the locking tang, enabling removal of the optical transceiver from the cage.

15. An unlocking tool for an optical module, comprising:
   a slide that is at least partially independent of the optical module, the slide being shaped for insertion into a cage between an electromagnetic interference (EMI) gasket of the cage and a surface of the optical module, and being shaped to disengage a locking tang of the cage from a corresponding cutout of the optical module, the slide having a monolithic construction comprising:
two flat arms arranged parallel to one another; and
a pull portion disposed between and connecting the two flat arms,
wherein each flat arm, of the two flat arms, has a first end connected to the pull portion and a second end distal to the pull portion,
wherein each flat arm remains flat from the first end to the second end, and
wherein each flat arm is arranged perpendicular to the pull portion relative to an axis aligned with the first end and the second end of the flat arm, and wherein the two flat arms, when disposed between a housing of the optical module and the EMI gasket, are shaped to disengage the corresponding cutout from the locking tang, enabling removal of the optical module from the cage.

16. The unlocking tool of claim 15, wherein the unlocking tool is a change key specific to the optical module.

17. The unlocking tool of claim 15, wherein the unlocking tool is a master key general to a plurality of optical modules.

18. The unlocking tool of claim 15, wherein the slide is partially independent and is attachable to the optical module such that the unlocking tool is not fixed in a gap between a surface of the EMI gasket and the surface of the optical module.

19. The unlocking tool of claim 15, wherein the slide is independent such that the slide is not attached to the optical module.

20. The unlocking tool of claim 15, wherein a thickness of the slide is less than 0.2 millimeters (mm).

\* \* \* \* \*